(12) United States Patent
Shaw

(10) Patent No.: US 8,700,350 B2
(45) Date of Patent: Apr. 15, 2014

(54) CARD INTERFACE DIRECTION DETECTION SYSTEM

(75) Inventor: Ronald D. Shaw, Shakopee, MN (US)

(73) Assignee: Dell Products L.P., Round Rock, TX (US)

( * ) Notice: Subject to any disclaimer, the term of this patent is extended or adjusted under 35 U.S.C. 154(b) by 1230 days.

(21) Appl. No.: 12/572,648

(22) Filed: Oct. 2, 2009

(65) Prior Publication Data

US 2011/0082661 A1    Apr. 7, 2011

(51) Int. Cl.
*G06F 19/00*    (2011.01)

(52) U.S. Cl.
USPC .......................... 702/120; 710/301; 713/330

(58) Field of Classification Search
USPC .............. 702/120; 703/27; 710/301; 713/330
See application file for complete search history.

(56) References Cited

U.S. PATENT DOCUMENTS 5,748,912 A * 5/1998 Lee ............................... 710/301
7,155,624 B2 * 12/2006 Kwatra ......................... 713/330

OTHER PUBLICATIONS

Ronald Shaw, Display-Mini Card (DMC) Definition, PCI-SIG, Apr. 2, 2009, 57 pages, Round Rock, Texas.

* cited by examiner

*Primary Examiner* — Jonathan C. Teixeira Moffat
*Assistant Examiner* — Hien Vo
(74) *Attorney, Agent, or Firm* — Haynes and Boone, LLP

(57) ABSTRACT

A card interface direction detection system includes a card. A power pin is mounted to the card and connected to a power source. A ground pin is mounted to the card and connected to a ground. A direction pin is mounted to the card. A controller is coupled to an information handling system (IHS) and that includes an in node and an out node that are each connected to the direction pin. The in node is directly connected to the direction pin and a resistor is located between the out node and the direction pin such that a signal sent through out node results in a signal received through the in node that allows the controller to detect whether the mode of operation of the card is supported by the IHS.

20 Claims, 14 Drawing Sheets

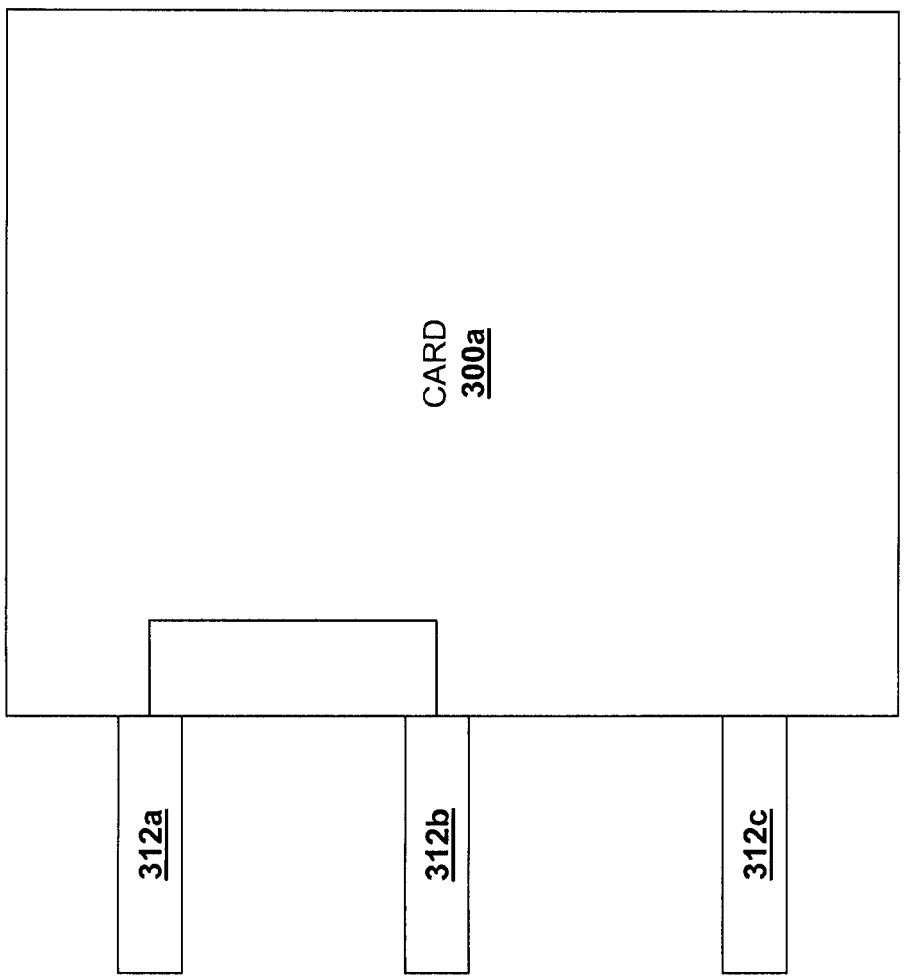

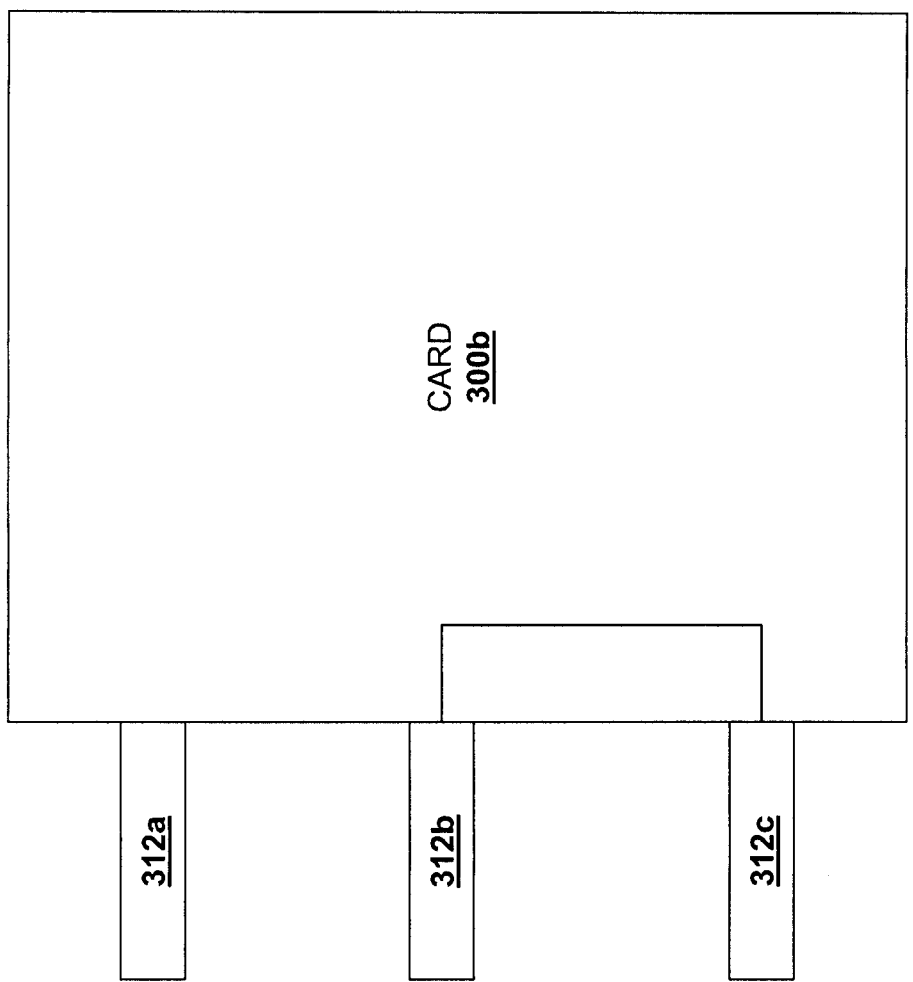

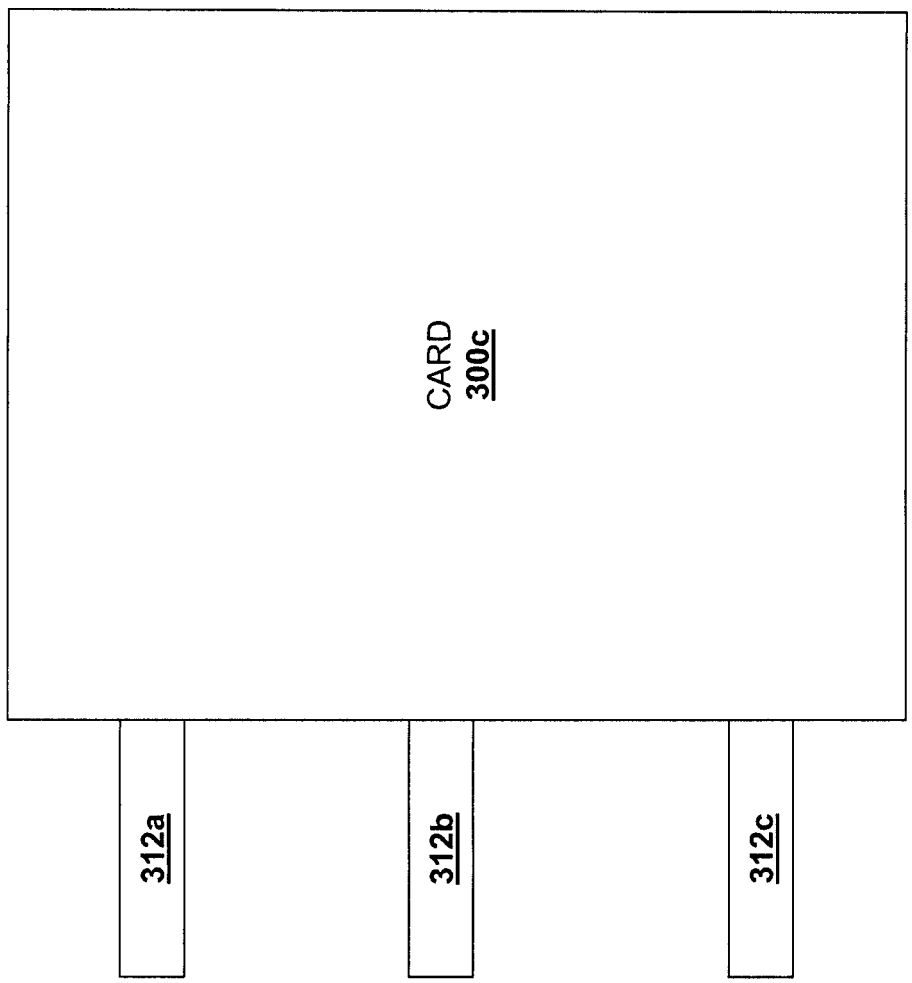

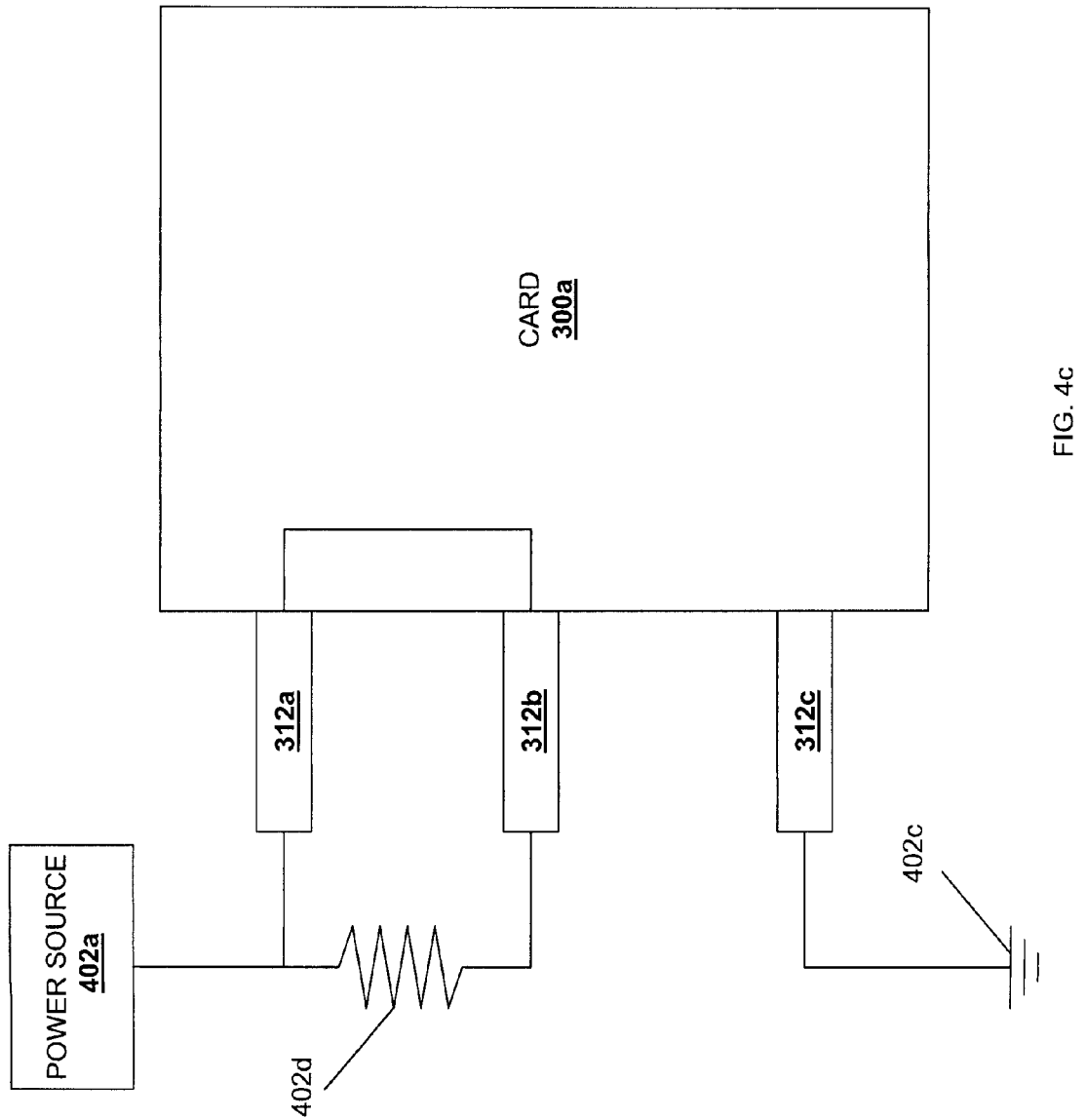

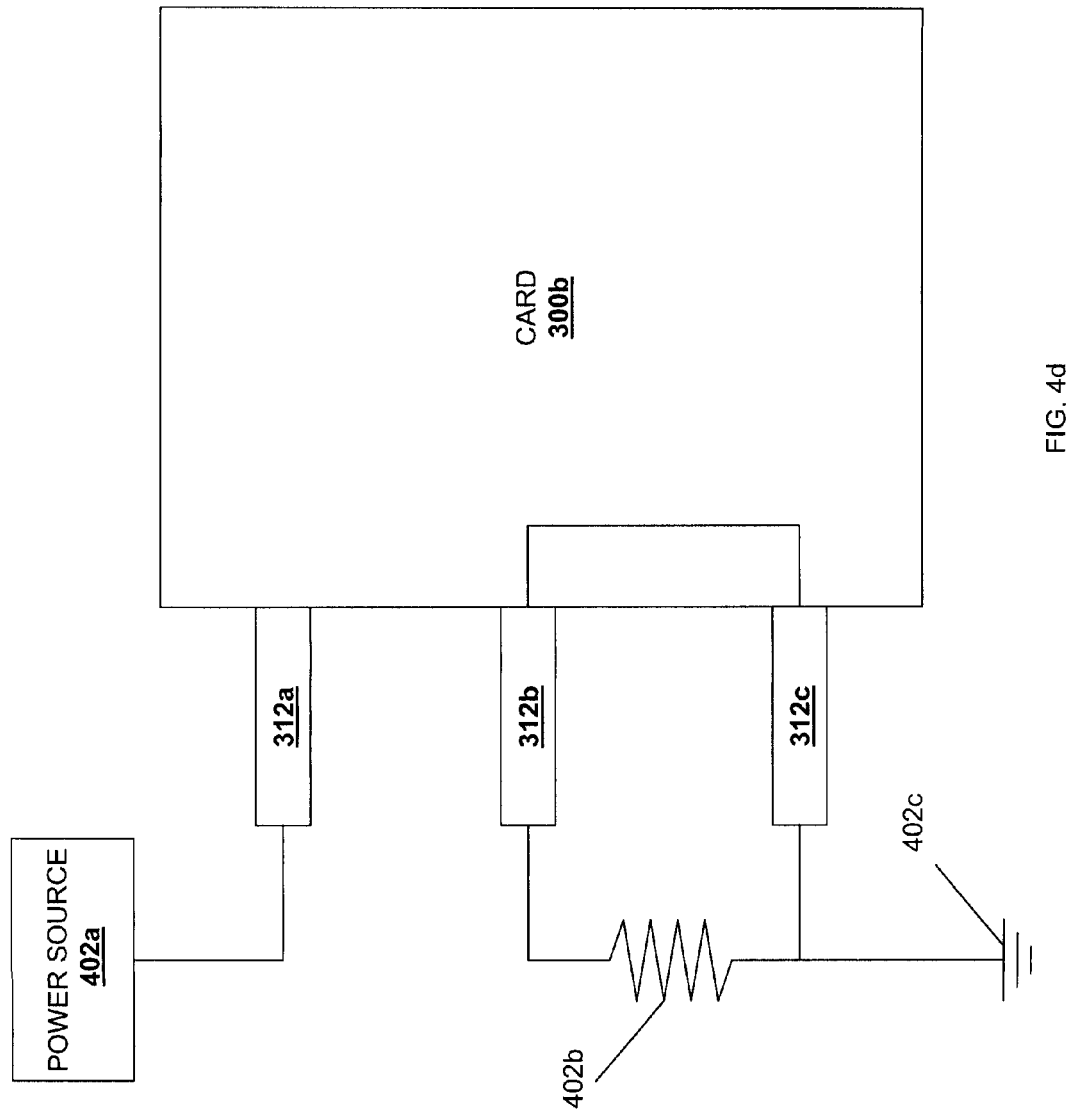

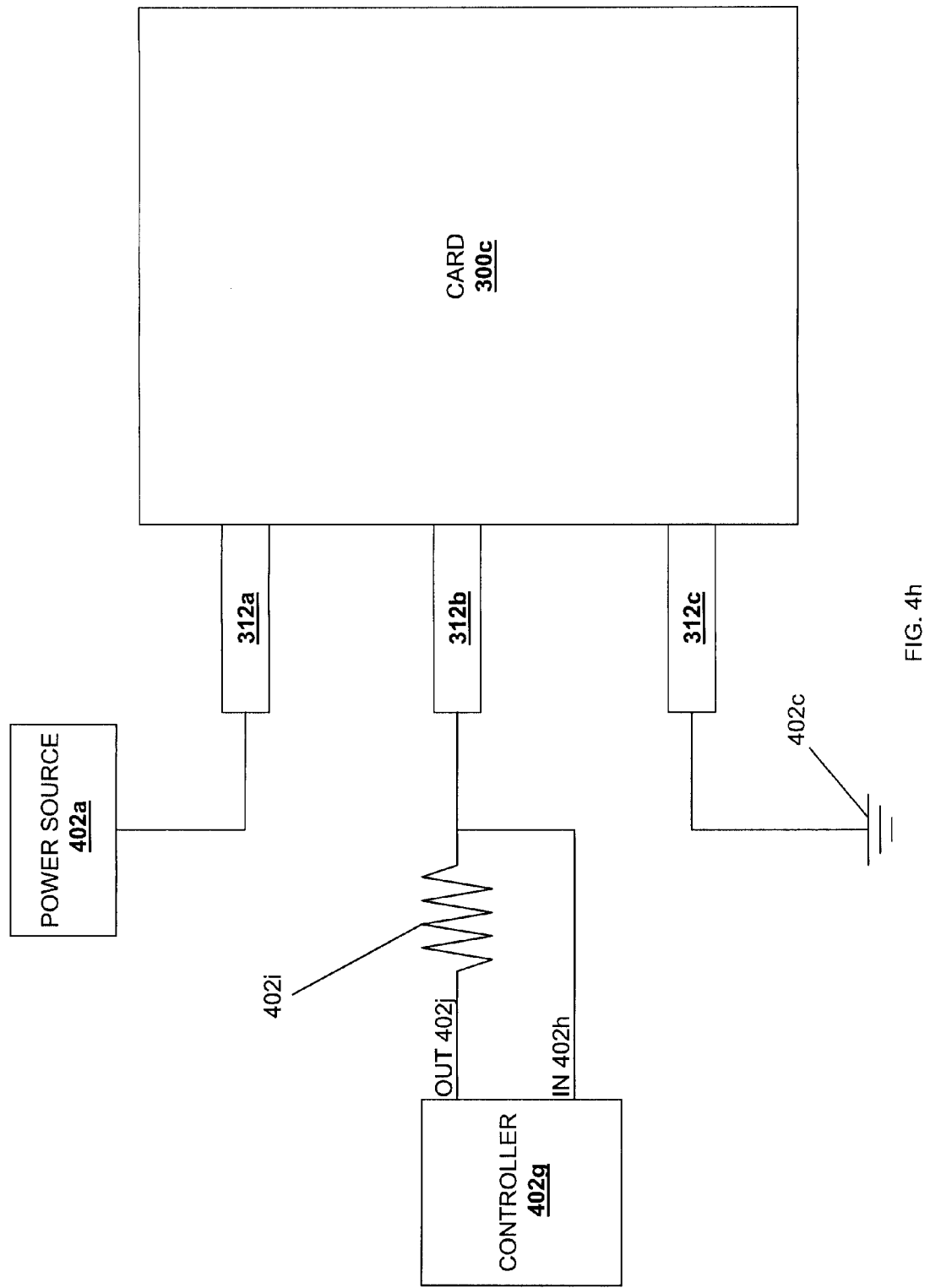

CARD INTERFACE DIRECTION DETECTION SYSTEM

BACKGROUND

The present disclosure relates generally to information handling systems, and more particularly to a card interface direction detection system for a card coupled to an information handling system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Some IHSs include cards such as, for example, Display Mini-Cards. Display Mini-Cards include a direction pin that transmits the direction control signal for the card. These direction pins are hard-wired to allow the Display Mini-Card to function as a source (e.g., for signals that are transmitted wirelessly from outside the IHS to the card, and then from the card to an IHS display), an endpoint (e.g., for signals that are transmitted from the IHS to the card, and then wirelessly from the card to a display that is outside the IHS), or a bi-directional interface that allows the card to function as both a source and an endpoint. However, the IHS may be manufactured to support only particular Display Mini-Cards (i.e., some IHSs may only support source Display Mini-Cards, some IHSs may only support endpoint Display Mini-Cards, and some IHSs may only support bi-directional Display Mini-Cards). This can result in the wrong type of Display Mini-Card being coupled to the IHS during the manufacture of the IHS, which is an error that may not be discovered until a user of the IHS attempts to utilize the functions of the Display Mini-Card.

Accordingly, it would be desirable to provide a system to utilize, detect, diagnose, and/or control a Display Mini-Card configuration.

SUMMARY

A card interface direction detection system includes a card having a power pin mounted to the card and connected to a power source, a ground pin mounted to the card and connected to a ground, and a direction pin mounted to the card, and a controller that is coupled to an IHS and that comprises an in node and an out node that are each connected to the direction pin, wherein the in node is directly connected to the direction pin and a resistor is located between the out node and the direction pin such that a signal sent through out node results in a signal received through the in node that allows the controller to detect whether the mode of operation of the card is supported by the IHS.

BRIEF DESCRIPTION OF THE DRAWINGS

FIG. 3b is a schematic view illustrating an embodiment of the card of FIG. 3a.

FIG. 3c is a schematic view illustrating an embodiment of the card of FIG. 3a.

FIG. 3d is a schematic view illustrating an embodiment of the card of FIG. 3a.

FIG. 4c is a schematic view illustrating an embodiment of the card of FIG. 3b coupled to the IHS of FIG. 2 having a first card connector and IHS configuration.

FIG. 4d is a schematic view illustrating an embodiment of the card of FIG. 3c coupled to the IHS of FIG. 2 having a second card connector and IHS configuration.

FIG. 4h is a schematic view illustrating an embodiment of the card of FIG. 3d coupled to the IHS of FIG. 2 having a fourth card connector and IHS configuration.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
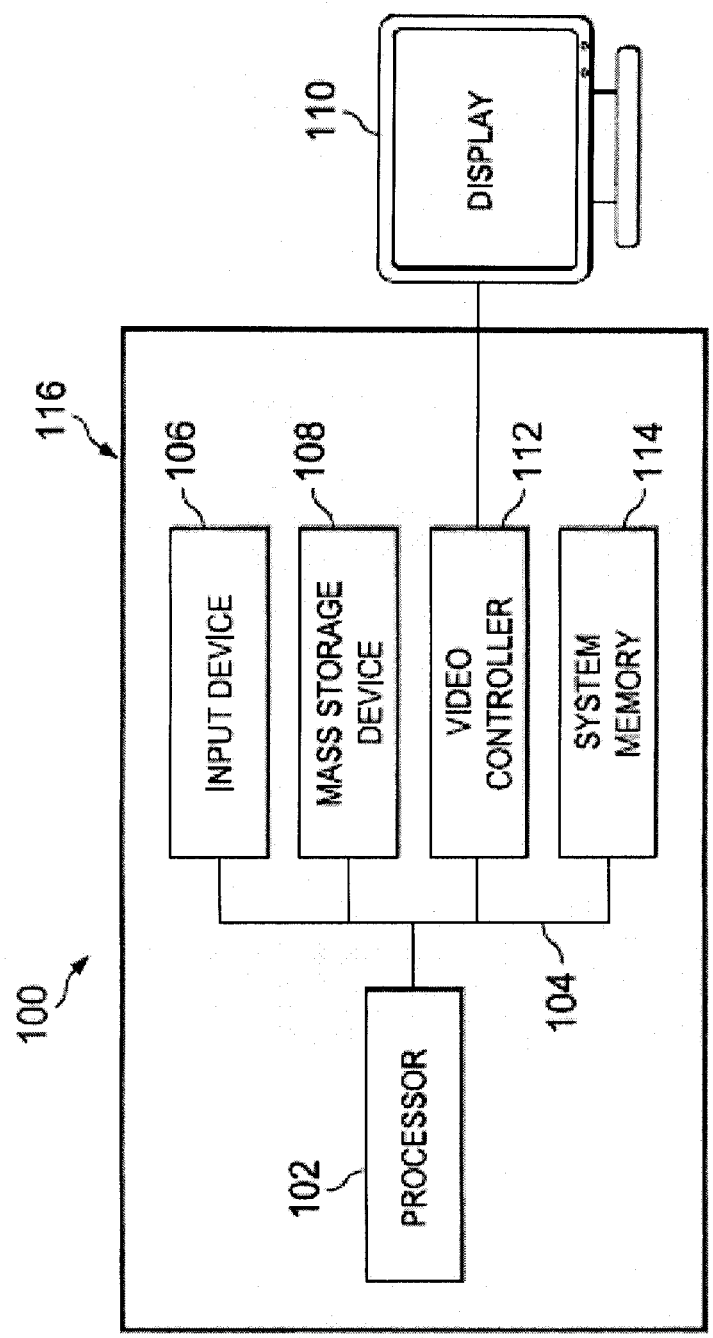
FIG. 1 is a schematic view illustrating an embodiment of an IHS.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
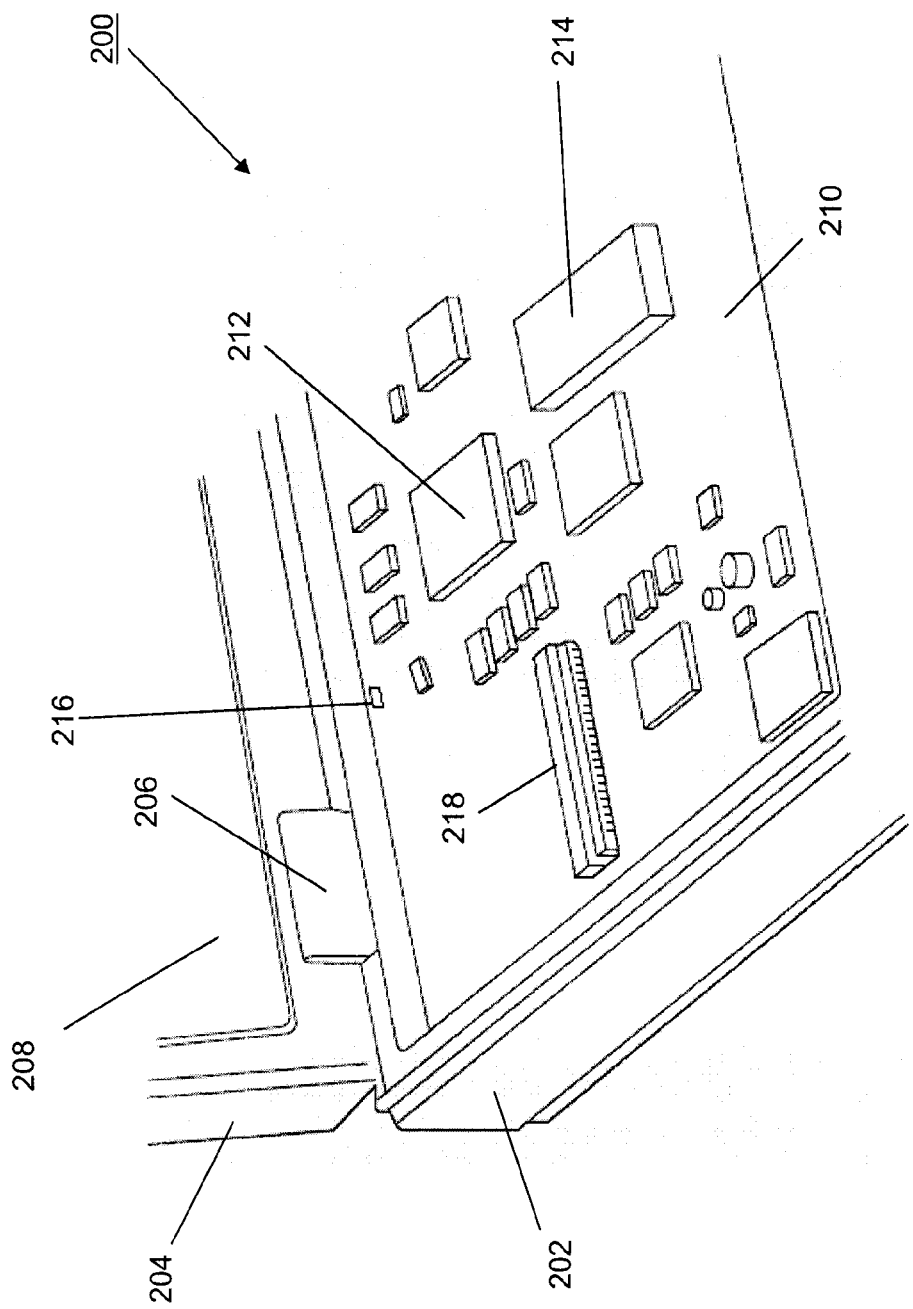
FIG. 2 is a perspective view illustrating an embodiment of an IHS including a card connector.
Figure 3A:
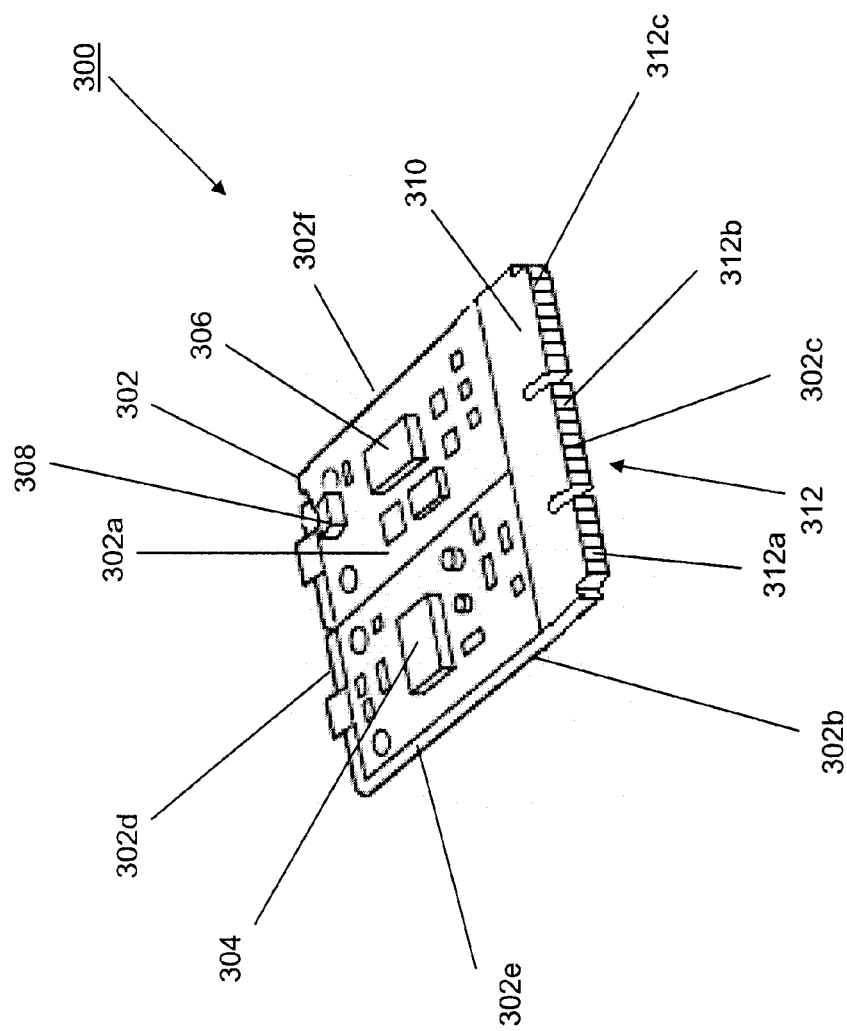
FIG. 3a is a perspective view illustrating an embodiment of a card that is used with the IHS of FIG. 2.

Referring now to FIG. 2, an IHS 200 is illustrated. In an embodiment, the IHS 200 may include some or all of the components of the IHS 100, described above with reference to FIG. 1. For example, the IHS 200 includes a base chassis 202 moveably coupled to a display chassis 204 by a hinge 206. In an embodiment, the base chassis 202 and/or the display chassis 204 may be the chassis 116, described above with reference to FIG. 1. The display chassis 204 houses a display 208 which may be the display 110, described above with reference to FIG. 1. The base chassis 202 houses a board 210 that includes a plurality of IHS components mounted to it such as, for example, a processor 212 that may be the processor 102 described above with reference to FIG. 1, a memory 214 that may be the system memory 114 described above with reference to FIG. 1, an antenna connector 216, and/or a variety of other IHS components known in the art. A card connector 218 is mounted to the board 210, In an embodiment, the card connector 218 is a Display-Mini Card connector such as, for example, the type described in Display-Mini Card (DMC) Definition, available at http://www.pcisig.com/specifications/pciexpress/specifications/mini-Card_DMC_final.pdf, the disclosure of which is incorporated herein by reference in its entirety. In an embodiment, the IHS 200 and card connector 218 may be configured to support a card such as, for example, a Display-Mini Card, that operates in a receive mode of operation. In an embodiment, the IHS 200 and card connector 218 may be configured to support a card such as, for example, a Display-Mini Card, that operates in a transmit mode of operation. In an embodiment, the IHS 200 and card connector 218 may be configured to support a card such as, for example, a Display-Mini Card, that operates in a controlled/bi-directional mode of operation. In an embodiment, the card connector 218 is a 76-pin card edge type connector.

Referring now to FIGS. 3*a*, 3*b*, 3*c* and 3*d*, a card 300 is illustrated. The card 300 includes a base 302 having a top surface 302*a*, a bottom surface 302*b* located opposite the top surface 302*a*, a front edge 302*c* extending between the top surface 302*a* and the bottom surface 302*b*, a rear edge 302*d* located opposite the front edge 302*c* and extending between the top surface 302*a* and the bottom surface 302*b*, and a pair of opposing side edges 302*e* and 302*f* extending between the top surface 302*a*, the bottom surface 302*b*, the front edge 302*c*, and the rear edge 302*d*. The card 300 may include a variety of components known in the art on the top surface 302*a* and/or the bottom surface 302*b* such as, for example, a processor 304, a memory 306, and/or a connector 308. A connecting edge 310 is included on the card 300 immediately adjacent the front edge 302*c*. In an embodiment, the card 300 is a Display-Mini Card such as, for example, the type described in Display-Mini Card (DMC) Definition, available at http://www.pcisig.com/specifications/pciexpress/specifications/mini-Card_DMC_final.pdf, the disclosure of which is incorporated herein by reference in its entirety. In an embodiment, the connecting edge 310 is a 76 pin connecting edge that includes a plurality of pins 312 known in the art such as, for example, a power pin 312*a*, a direction pin 312*b*, and a ground pin 312*c*. In an embodiment, the direction pin 312*b* transmits a Display Port Main Link Direction (MLDIR) Control Signal. In an embodiment, the card 300 includes a plurality of pins other than those illustrated, but those pins have not been illustrated for clarity of discussion. In the embodiment illustrated in FIG. 3*b*, the card 300*a* is set to operate in a receive mode of operation and the power pin 312*a* is coupled to the direction pin 312*b*. In the embodiment illustrated in FIG. 3*c*, the card 300*b* is set to operate in a transmit mode of operation and the ground pin 312*c* is coupled to the direction pin 312*b*. In the embodiment illustrated in FIG. 3*d*, the card 300*c* is set to operate in a controlled/bi-directional mode of operation and the direction pin 312*b* is not coupled to the power pin 312*a* or the ground pin 312*c* in the manner illustrated for the cards 300*a* and 300*b* in FIGS. 3*b* and 3*c*, respectively.

Figure 4A:
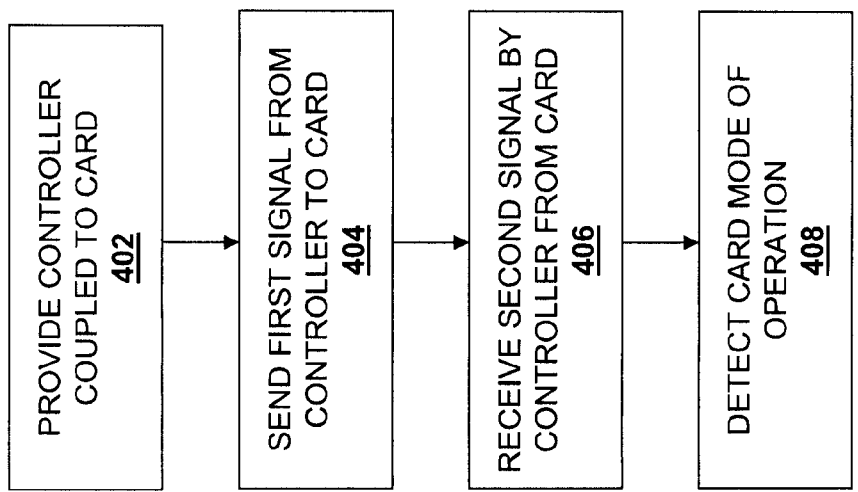
FIG. 4a is a flow chart illustrating an embodiment of a method for detecting the direction of a card interface.
Figure 4A:
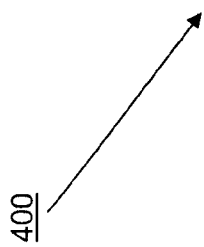
Figure 4B:
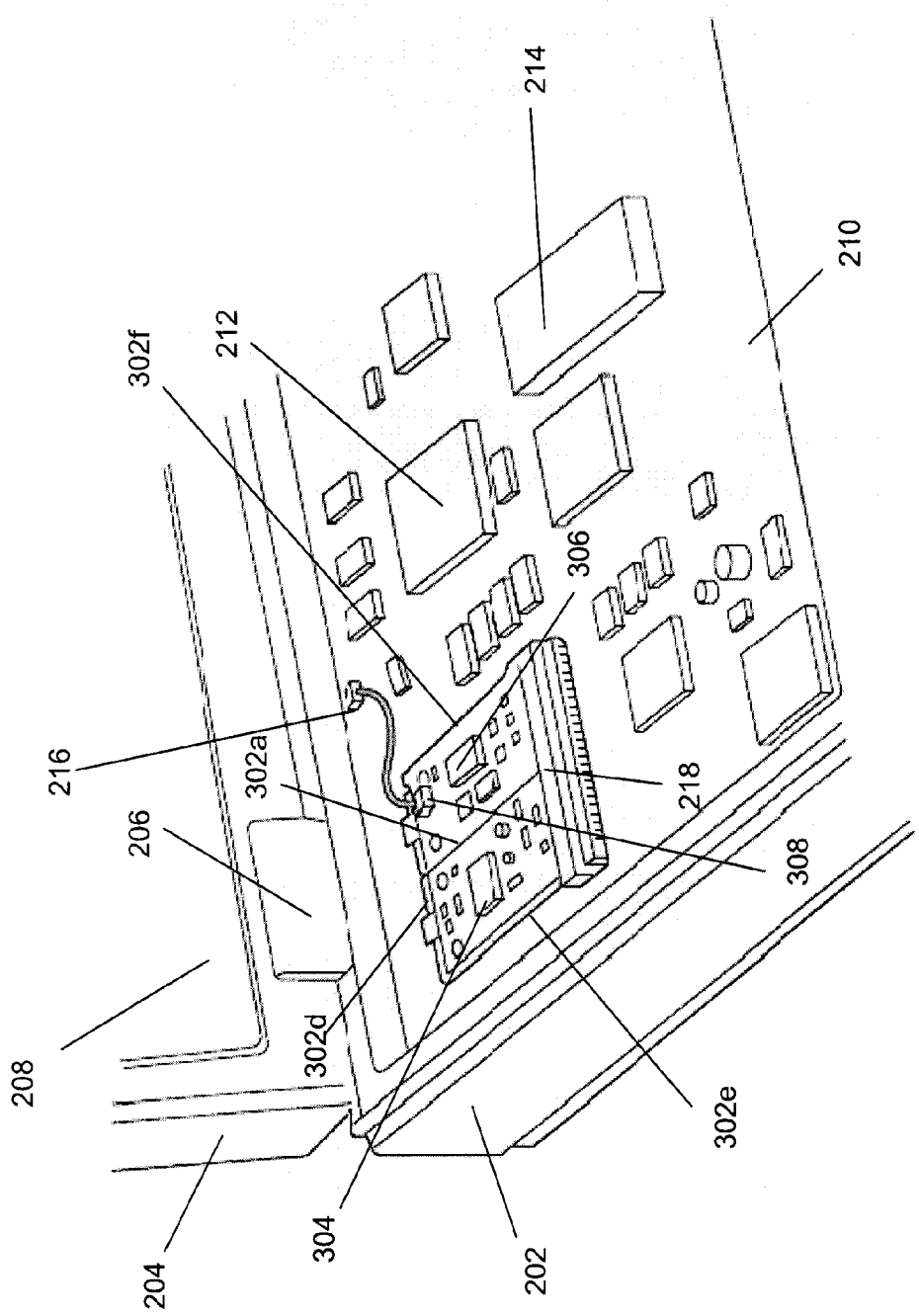
FIG. 4b is a perspective view illustrating an embodiment of the card of FIG. 3a coupled to the IHS of FIG. 2.

Referring now to FIGS. 4*a* and 4*b*, a method 400 for detecting the direction of a card interface is illustrated. The method 400 begins at block 402 where a controller is provided that is coupled to a card. The card 300, described above with reference to FIG. 3*a*, is coupled to the IHS 200, described above with reference to FIG. 2, by, for example, inserting the connecting edge 310 of the card 300 in the card connector 218 on the IHS 200 and/or connecting the connector 308 on the card 300 with the antenna connector 216 on the IHS 200 using methods known in the art (e.g., an antenna cable in the illustrated embodiment). A plurality of different embodiments of the connections between the card 300 and the IHS 200 that connect the card 300 to components of the IHS 200 will now be described:

Referring now to FIG. 4*c*, in an embodiment, the card connector 218 (not illustrated for clarity) may be coupled to a power source 402*a*, a resistor 402*d*, and a ground 402*c*, with the resistor 402*d* connected to the power source 402*a*. In such an embodiment, when the card 300 is connected to the card connector 218, the power pin 312*a* on the card 300 is connected to the power source 402*a*, the direction pin 312*b* is connected to the resistor 402*d* (which is then connected to the power source 402*a*), and the ground pin 312*c* is connected to the ground 402*c*. The embodiment illustrated in FIG. 4*c* is appropriate for a card such as, for example, a Display Mini-Card and/or the card 300*a*, described above with reference to FIG. 3*b*, that operates in a receive mode of operation (i.e., the card is operable to wirelessly receive data such as, for example, a video signal, from a source outside of the IHS 200 and transmit that data to a display of the IHS 200). However, this embodiment is not appropriate for a card such as, for example, a Display Mini-Card and/or the card 300*b*, described above with reference to FIG. 3*c*, that operates in a transmit mode of operation (i.e., the card is operable to wirelessly transmit data such as, for example, a video signal, from the IHS 200 to a display that is located outside the IHS 200). Thus, the card 300*a* that operates in a receive mode of operation will operate correctly when coupled to the card connector 218 and IHS 200, as illustrated in FIG. 4*c*, but if the card 300*b* that operates in a transmit mode of operation is coupled to the card connector 218 and IHS 200 of the embodiment of FIG. 4*c*, that card will not operate correctly.

Referring now to FIG. 4d, in one embodiment, the card connector 218 (not illustrated for clarity) may be coupled to the power source 402a, the resistor 402b, and the ground 402c, with the resistor 402b connected to the ground 402c. In such an embodiment, when the card 300 is connected to the card connector 218, the power pin 312a on the card 300 is connected to the power source 402a, the direction pin 312b is connected to the resistor 402b (which is then connected to the ground 402c), and the ground pin 312c is connected to the ground 402c. The embodiment illustrated in FIG. 4d is appropriate for a card such as, for example, a Display Mini-Card and/or the card 300b, described above with reference to FIG. 3c, that operates in a transmit mode of operation (i.e., the card is operable to wirelessly transmit data such as, for example, a video signal, from the IHS 200 to a display that is located outside the IHS 200). However, this embodiment is not appropriate for a card such as, for example, a Display Mini-Card and/or the card 300a, described above with reference to FIG. 3b, that operates in a receive mode of operation (i.e., the card is operable to wirelessly receive data such as, for example, a video signal, from a source outside of the IHS 200 and transmit that data to a display of the IHS 200). Thus, the card 300b that operates in a transmit mode of operation will operate correctly when coupled to the card connector 218 and IHS 200, as illustrated in FIG. 4d, but if the card 300a that operates in a receive mode of operation is coupled to the card connector 218 and IHS 200 of the embodiment of FIG. 4d, that card will not operate correctly.

Figure 4E:
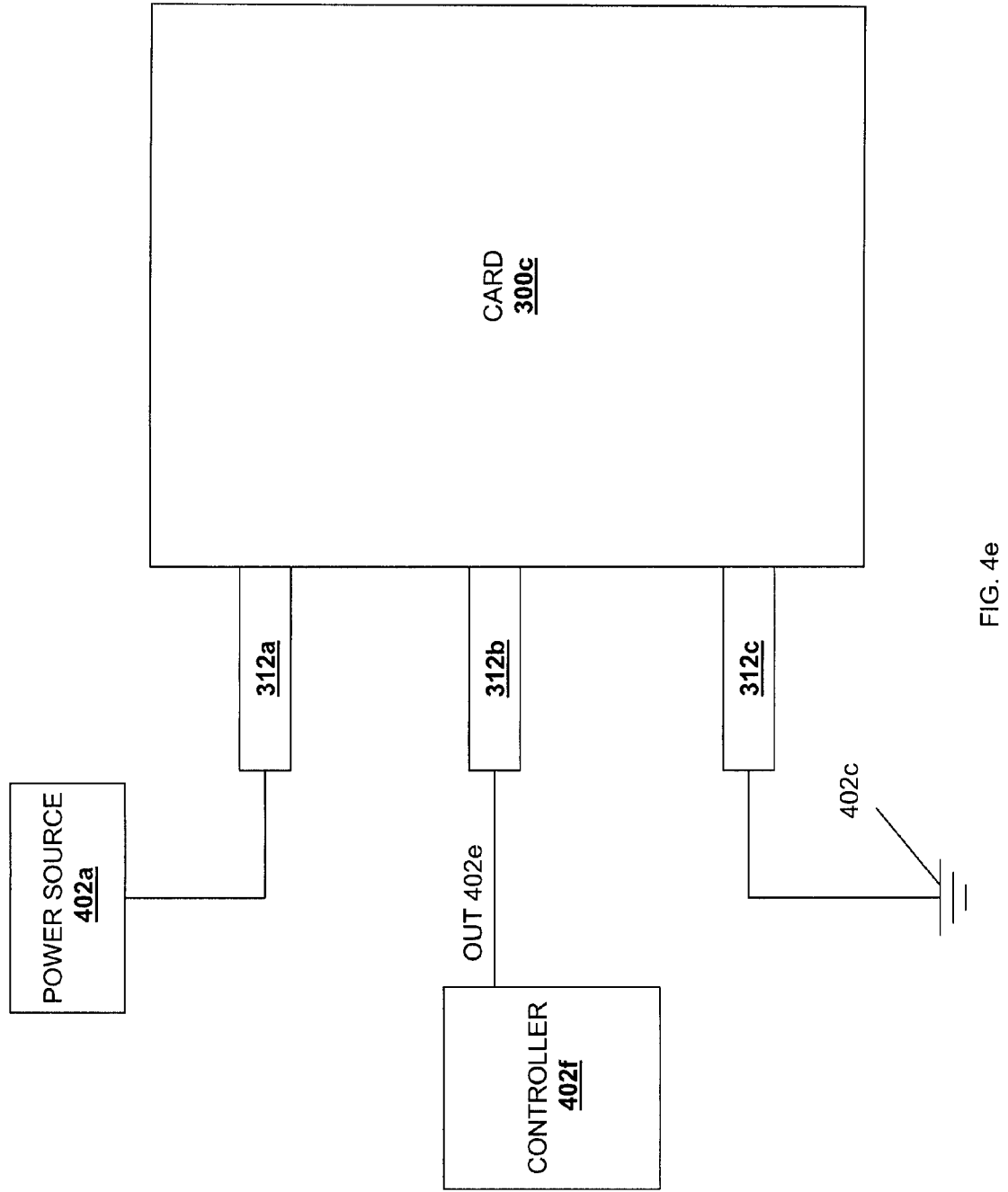
FIG. 4e is a schematic view illustrating an embodiment of the card of FIG. 3d coupled to the IHS of FIG. 2 having a third card connector and IHS configuration.

Referring now to FIG. 4e, in another embodiment, the card connector 218 (not illustrated for clarity) may be coupled to the power source 402a, an out node 402e that is located on a controller 402f, and the ground 402c. In such an embodiment, when the card 300 is connected to the card connector 218, the power pin 312a on the card 300 is connected to the power source 402a, the direction pin 312b is connected to the controller 402 through the out node 402e, and the ground pin 312c is connected to the ground 402c. The embodiment illustrated in FIG. 4e is appropriate for a card such as, for example, a Display Mini-Card and/or the card 300c, described above with reference to FIG. 3d, that operates in a controlled/bidirectional mode of operation (i.e., the card is controllable such that it is operable to wirelessly transmit data such as, for example, a video signal, from the IHS 200 to a display that is located outside the IHS 200 and to wirelessly receive data such as, for example, a video signal, from a source outside of the IHS 200 and transmit that data to a display of the IHS 200). However, this embodiment is not appropriate for a card such as, for example, a Display Mini-Card and/or the card 300a, described above with reference to 3b, that operates only in a receive mode of operation (i.e., the card is operable to wirelessly receive data such as, for example, a video signal, from a source outside of the IHS 200 and transmit that data to a display of the IHS 200), or a card such as, for example, a Display Mini-Card and/or the card 300b, described above with reference to FIG. 3c, that operates only in a transmit mode of operation (i.e., the card is operable to wirelessly transmit data such as, for example, a video signal, from the IHS 200 to a display that is located outside the IHS 200). Thus, the card 300c that operates in a controlled mode of operation will operate correctly when coupled to the card connector 218 and IHS 200, as illustrated in FIG. 4e, but if the cards 300a and 300b that operates only in the receive mode of operation and only the transmit mode of operation, respectively, are coupled to the card connector 218 and IHS 200 of the embodiment of FIG. 4e, those cards will not operate correctly.

Figure 4F:
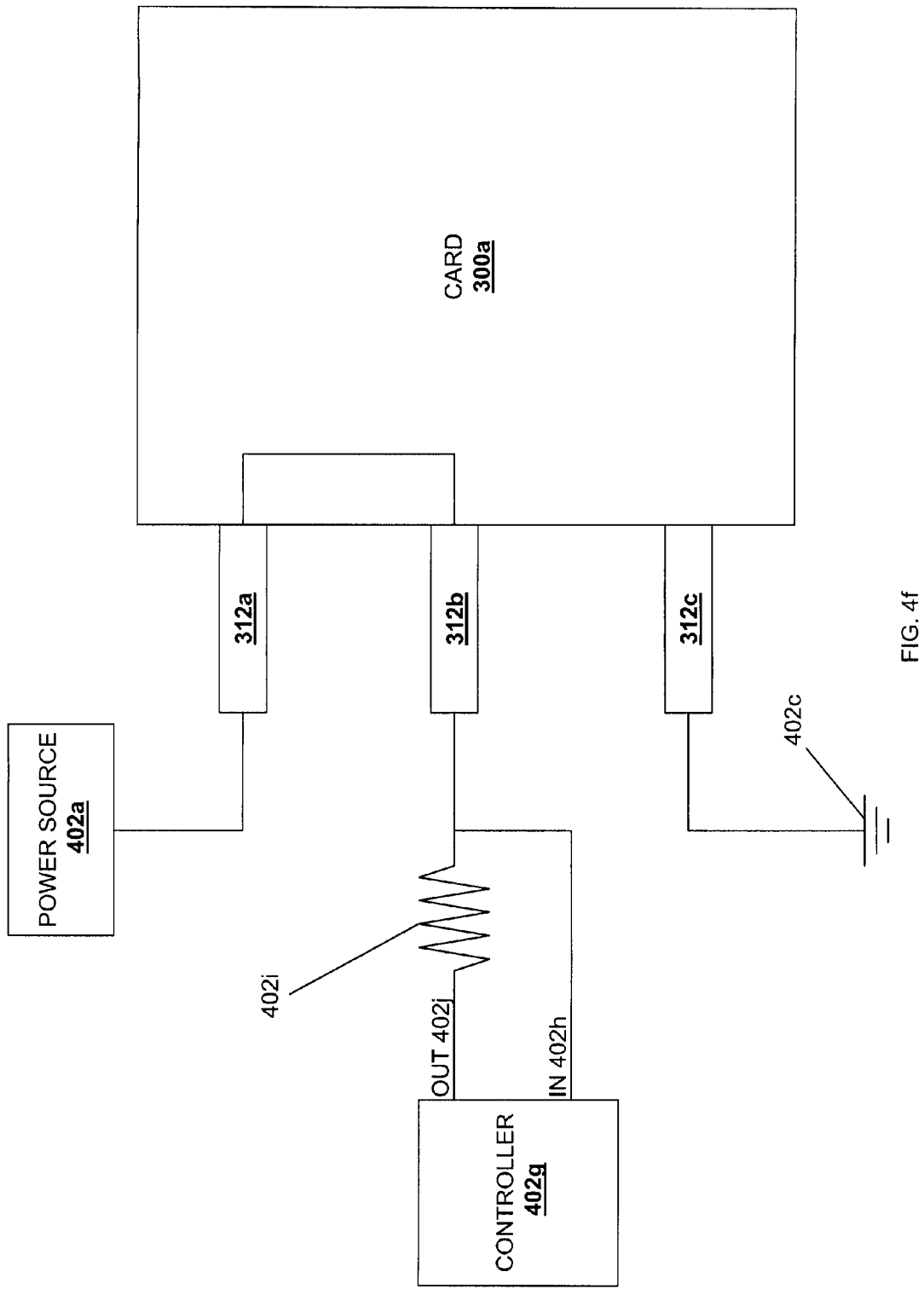
FIG. 4f is a schematic view illustrating an embodiment of the card of FIG. 3b coupled to the IHS of FIG. 2 having a fourth card connector and IHS configuration.

Referring now to FIG. 4f, an embodiment is illustrated that allows the detection of whether a card operating in a receive mode of operation (e.g., the card 300a, described above with reference to FIG. 3b), a transmit mode of operation (e.g., the card 300b, described above with reference to FIG. 3c), or a controlled mode of operation (e.g., the card 300c, described above with reference to FIG. 3d), is coupled to a card connector and an IHS that are configured to support their mode of operation. The card connector 218 (not illustrated for clarity) may be coupled to the power source 402a and the ground 402c, while also being coupled to a controller 402g through a direct connection to an in node 402h and through a resistor 402i to an out node 402j. In such an embodiment, when the card 300 is connected to the card connector 218, the power pin 312a on the card 300 is connected to the power source 402a, the direction pin 312b is connected to the controller 402g through a direct connection to the in node 402h and through the resistor 402i to the out node 402j, and the ground pin 312c is connected to the ground 402c.

Referring now to FIGS. 4a, 4f, 4g and 4h, the method 400 then proceeds to block 404 where a first signal is sent from the controller to the card. In an embodiment, the controller 402g may send either a low signal (e.g., logical zero) or a high signal (e.g., logical one) from the out node 402j, through the resistor 402i, through the direction pin 312b, and to the card 300. The method 400 then proceeds to block 406, where the controller 402g receives a second signal from the card 300. In receiving the first signal from the controller 402g in block 404, the card 300 will send, depending on the mode of operation of the card 300, either a low signal (e.g., logical zero) or a high signal (e.g., logical one) through the direction pin 312b and to the controller 402g through the in node 402h due to the resistor 402i. The method 400 then proceeds to block 408 where mode of operation of the card 300 is detected and/or controlled. In an embodiment, the detection and/or control of the card mode of operation in block 408 of the method 400 may be based on the first signal and second signal as detailed in the chart below:

| SUPPORTED CARD MODE OF OPERATION | DIRECTION PIN CONNECTION | FIRST SIGNAL | SECOND SIGNAL | DETECTION/ CONTROL |
| --- | --- | --- | --- | --- |
| RECEIVE | POWER SOURCE | LOW (0) | HIGH (1) | WRONG CARD |
|  | POWER SOURCE | HIGH (1) | HIGH (1) | CORRECT CARD |
| TRANSMIT | GROUND | LOW (0) | LOW (0) | CORRECT CARD |
|  | GROUND | HIGH (1) | LOW (0) | WRONG CARD |
| CONTROL | OPEN | LOW (0) | LOW (0) | CARD SET TO TRANSMIT |
|  | OPEN | HIGH (1) | HIGH (1) | CARD SET TO RECEIVE |

Figure 4G:
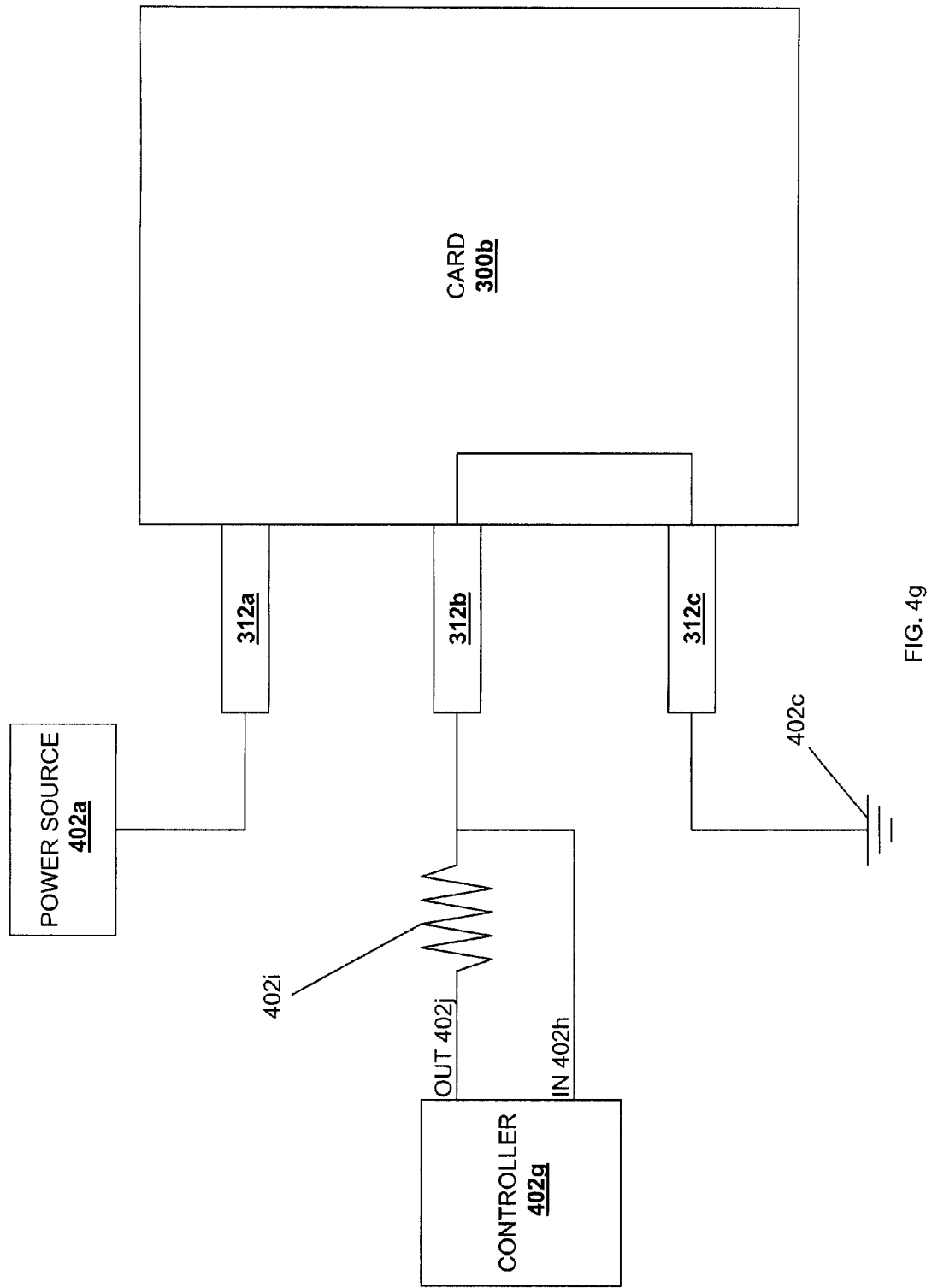
FIG. 4g is a schematic view illustrating an embodiment of the card of FIG. 3c coupled to the IHS of FIG. 2 having a fourth card connector and IHS configuration.

In one embodiment, the card connector 218 and IHS 200 may be configured to support cards that operate in a receive mode of operation. After connecting a card to the card connector 218, the controller 402g may send a low signal (e.g., logical zero) from the out node 402j, through the resistor 402i, through the direction pin 312b, and to the card. If the card 300b that is set for a transmit mode of operation or the card 300c that is set for a controlled mode of are operation are coupled to the card connector 218 on the IHS 200, as illustrated in FIGS. 4g and 4h, respectively, in response to the low signal sent by the controller 402g at block 404 of the method 400, the cards 300b or 300c will send a high signal (e.g., logical one), at block 406 of the method 400, through the direction pin 312b that will be directed to the in node 402h due to the resistor 402i such that the high signal is received the controller 402g. When the card connector 218 and IHS 200 are configured to support cards that operate in a receive mode of operation, and the controller 402g sends a low signal and receives a high signal, the controller 402g will determine that the wrong card is coupled to the card connector 218 and IHS 200 and thus will not operate correctly. In such a situation, the controller 402g may be used to provide an alert that an incorrect card has been coupled to the IHS. After connecting a card to the card connector 218, the controller 402g may send a high signal (e.g., logical one) from the out node 402j, through the resistor 402i, through the direction pin 312b, and to the card. If the card 300a that is set for a receive mode of operation is coupled to the card connector 218 on the IHS 200, as illustrated in FIG. 4f, in response to the high signal sent by the controller 402g at block 404 of the method 400, the card 300a will send a high signal (e.g., logical one), at block 406 of the method 400, through the direction pin 312b that will be directed to the in node 402h due to the resistor 402i such that the high signal is received the controller 402g. When the card connector 218 and IHS 200 are configured to support cards that operate in a receive mode of operation, and the controller 402g sends a high signal and receives a high signal, the controller 402g will determine that the correct card is coupled to the card connector 218 and IHS 200 and thus will operate correctly.

In another embodiment, the card connector 218 and IHS 200 may be configured to support cards that operate in a transmit mode of operation. After connecting a card to the card connector 218, the controller 402g may send a low signal (e.g., logical zero) from the out node 402j, through the resistor 402i, through the direction pin 312b, and to the card. If the card 300b that is set for a transmit mode of operation is coupled to the card connector 218 on the IHS 200, as illustrated in FIG. 4g, in response to the low signal sent by the controller 402g at block 404 of the method 400, the card 300b will send a low signal (e.g., logical zero), at block 406 of the method 400, through the direction pin 312b that will be directed to the in node 402h due to the resistor 402i such that the low signal is received the controller 402g. When the card connector 218 and IHS 200 are configured to support cards that operate in a transmit mode of operation, and the controller 402g sends a low signal and receives a low signal, the controller 402g will determine that the correct card is coupled to the card connector 218 and IHS 200 and thus will operate correctly. After connecting a card to the card connector 218, the controller 402g may send a high signal (e.g., logical one) from the out node 402j, through the resistor 402i, through the direction pin 312b, and to the card. If the cards 300a that is set for a receive mode of operation or the card 300c that is set for a controlled mode of are operation are coupled to the card connector 218 on the IHS 200, as illustrated in FIGS. 4f and 4h, respectively, in response to the high signal sent by the controller 402g at block 404 of the method 400, the cards 300a or 300c will send a low signal (e.g., logical zero), at block 406 of the method 400, through the direction pin 312b that will be directed to the in node 402h due to the resistor 402i such that the low signal is received the controller 402g. When the card connector 218 and IHS 200 are configured to support cards that operate in a transmit mode of operation, and the controller 402g sends a high signal and receives a low signal, the controller 402g will determine that the wrong card is coupled to the card connector 218 and IHS 200 and thus will not operate correctly. In such a situation, the controller 402g may be used to provide an alert that an incorrect card has been coupled to the IHS.

In another embodiment, the card connector 218 and IHS 200 may be configured to support cards that operate in a controlled mode of operation. After connecting a card to the card connector 218, the controller 402g may send a low signal (e.g., logical zero) from the out node 402j, through the resistor 402i, through the direction pin 312b, and to the card. If the card 300c that is set for a controlled mode of operation is coupled to the card connector 218 on the IHS 200, as illustrated in FIG. 4h, in response to the low signal sent by the controller 402g at block 404 of the method 400, the card 300c will be set to a transmit mode of operation and will send a low signal (e.g., logical zero), at block 406 of the method 400, through the direction pin 312b that will be directed to the in node 402h due to the resistor 402i such that the low signal is received the controller 402g. When the card connector 218 and IHS 200 are configured to support cards that operate in a controlled mode of operation, and the controller 402g sends a low signal and receives a low signal, the controller 402g will determine that the card is set to operate in a transmit mode of operation. After connecting a card to the card connector 218, the controller 402g may send a high signal (e.g., logical one) from the out node 402j, through the resistor 402i, through the direction pin 312b, and to the card. If the card 300c that is set for a controlled mode of operation is coupled to the card connector 218 on the IHS 200, as illustrated in FIG. 4h, in response to the high signal sent by the controller 402g at block 404 of the method 400, the card 300c will be set to a receive mode of operation and will send a high signal (e.g., logical zero), at block 406 of the method 400, through the direction pin 312b that will be directed to the in node 402h due to the resistor 402i such that the high signal is received the controller 402g. When the card connector 218 and IHS 200 are configured to support cards that operate in a controlled mode of operation, and the controller 402g sends a high signal and receives a high signal, the controller 402g will determine that the card is set to operate in a receive mode of operation.

Thus, a system and method have been described that allow the detection and control of the direction of a card interface such as, for example, a Display Mini-Card interface, which allows the determination of whether the card is being coupled to an IHS that supports that card and allows a controlled card to be set for a particular mode of operation.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A card interface direction detection system, comprising:
 a card comprising:
  a power pin mounted to the card and connected to a power source;
  a ground pin mounted to the card and connected to a ground; and a direction pin mounted to the card, wherein the direction pin is configured to transmit a signal that indicates a functional direction of at least one interface on the card; and a controller that is coupled to an information handling system (IHS) and that comprises an in node and an out node that are each connected to the direction pin, wherein the in node is directly connected to the direction pin and a resistor is located between the out node and the direction pin such that a signal sent through the out node results in a signal received through the in node that allows the controller to detect whether the mode of operation of the card is supported by the IHS.

2. The system of claim 1, wherein the card is a Display-Mini Card.

3. The system of claim 1, wherein the direction pin transmits a DisplayPort Main Link Direction control signal.

4. The system of claim 1, wherein the IHS that the controller is coupled to is configured to support cards that are set to operate in a receive mode of operation, and wherein the controller is operable to send a low signal through the out node to the direction pin and, in response to sending the low signal, the controller detects that the card is not supported by the IHS when a high signal is received through the in node, and wherein the controller is operable to send a high signal through the out node to the direction pin and, in response to sending the high signal, the controller detects that the card is supported by the IHS when a high signal is received through the in node.

5. The system of claim 1, wherein the IHS that the controller is coupled to is configured to support cards that are set to operate in a transmit mode of operation, and wherein the controller is operable to send a low signal through the out node to the direction pin and, in response to sending the low signal, the controller detects that the card is supported by the IHS when a low signal is received through the in node, and wherein the controller is operable to send a high signal through the out node to the direction pin and, in response to sending the high signal, the controller detects that the card is not supported by the IHS when a low signal is received through the in node.

6. The system of claim 1, wherein the IHS that the controller is coupled to is configured to support cards that are set to operate in a controlled/bi-directional mode of operation, and wherein the controller is operable to send a low signal through the out node to the direction pin and, in response to sending the low signal, the card is set to a transmit mode of operation, and wherein the controller is operable to send a high signal through the out node to the direction pin and, in response to sending the high signal, the card is set to a receive mode of operation.

7. The system of claim 1, wherein:

when the IHS that the controller is coupled to is configured to support cards that are set to operate in a receive mode of operation, the controller is operable to send a low signal through the out node to the direction pin and, in response to sending the low signal, the controller detects that the card is not supported by the IHS when a high signal is received through the in node, and the controller is operable to send a high signal through the out node to the direction pin and, in response to sending the high signal, the controller detects that the card is supported by the IHS when a high signal is received through the in node;

when the IHS that the controller is coupled to is configured to support cards that are set to operate in a transmit mode of operation, the controller is operable to send a low signal through the out node to the direction pin and, in response to sending the low signal, the controller detects that the card is supported by the IHS when a low signal is received through the in node, and the controller is operable to send a high signal through the out node to the direction pin and, in response to sending the high signal, the controller detects that the card is not supported by the IHS when a low signal is received through the in node; and when the IHS that the controller is coupled to is configured to support cards that are set to operate in a controlled/bi-directional mode of operation, the controller is operable to send a low signal through the out node to the direction pin and, in response to sending the low signal, the card is set to a transmit mode of operation, and the controller is operable to send a high signal through the out node to the direction pin and, in response to sending the high signal, the card is set to a receive mode of operation.

8. An information handling system (IHS), comprising:

a chassis;

a processor located in the chassis;

a memory located in the chassis and coupled to the processor;

a card located in the chassis and coupled to the processor, the card comprising:

a power pin mounted to the card and connected to a power source;

a ground pin mounted to the card and connected to a ground; and a direction pin mounted to the card, wherein the direction pin is configured to transmit a signal that indicates a functional direction of at least one interface on the card; and a controller comprising an in node and an out node that are each connected to the direction pin, wherein the in node is directly connected to the direction pin and a resistor is located between the out node and the direction pin such that a signal sent through the out node results in a signal received through the in node that allows the controller to detect whether the mode of operation of the card is supported by the IHS.

9. The system of claim 8, wherein the card is a Display-Mini Card.

10. The system of claim 8, wherein the direction pin transmits a DisplayPort Main Link Direction control signal.

11. The system of claim 8, wherein the IHS is configured to support cards that are set to operate in a receive mode of operation, and wherein the controller is operable to send a low signal through the out node to the direction pin and, in response to sending the low signal, the controller detects that the card is not supported by the IHS when a high signal is received through the in node, and wherein the controller is operable to send a high signal through the out node to the direction pin and, in response to sending the high signal, the controller detects that the card is supported by the IHS when a high signal is received through the in node.

12. The system of claim 8, wherein the IHS is configured to support cards that are set to operate in a transmit mode of operation, and wherein the controller is operable to send a low signal through the out node to the direction pin and, in response to sending the low signal, the controller detects that the card is supported by the IHS when a low signal is received through the in node, and wherein the controller is operable to send a high signal through the out node to the direction pin and, in response to sending the high signal, the controller detects that the card is not supported by the IHS when a low signal is received through the in node.

13. The system of claim 8, wherein the IHS is configured to support cards that are set to operate in a controlled/bi-directional mode of operation, and wherein the controller is operable to send a low signal through the out node to the direction pin and, in response to sending the low signal, the card is set to a transmit mode of operation, and wherein the controller is operable to send a high signal through the out node to the direction pin and, in response to sending the high signal, the card is set to a receive mode of operation.

14. The system of claim 8, wherein:
when the IHS is configured to support cards that are set to operate in a receive mode of operation, the controller is operable to send a low signal through the out node to the direction pin and, in response to sending the low signal, the controller detects that the card is not supported by the IHS when a high signal is received through the in node, and the controller is operable to send a high signal through the out node to the direction pin and, in response to sending the high signal, the controller detects that the card is supported by the IHS when a high signal is received through the in node;
when the IHS is configured to support cards that are set to operate in a transmit mode of operation, the controller is operable to send a low signal through the out node to the direction pin and, in response to sending the low signal, the controller detects that the card is supported by the IHS when a low signal is received through the in node, and the controller is operable to send a high signal through the out node to the direction pin and, in response to sending the high signal, the controller detects that the card is not supported by the IHS when a low signal is received through the in node; and
when the IHS is configured to support cards that are set to operate in a controlled/bi-directional mode of operation, the controller is operable to send a low signal through the out node to the direction pin and, in response to sending the low signal, the card is set to a transmit mode of operation, and the controller is operable to send a high signal through the out node to the direction pin and, in response to sending the high signal, the card is set to a receive mode of operation.

15. The system of claim 8, further comprising:
a display located in the chassis and coupled to the card and the processor, wherein when the controller detects that the card is in a receive mode of operation, the card is operable to receive a signal wirelessly and transmit the signal to the display.

16. The system of claim 8, further comprising:
a display, wherein when the controller detects that the card is in a transmit mode of operation, the card is operable to receive a signal from the processor and transmit the signal wirelessly to the display.

17. A method for detecting the direction of a card interface, comprising:
providing a controller coupled to an IHS and comprising an in node and an out node, wherein the in node is directly coupled to a direction pin on a card, the out node is coupled to the direction pin through a resistor, and the direction pin is configured to transmit a signal that indicates a functional direction of at least one interface on the card; and
sending a first signal through the out node of the controller to the direction pin, wherein in response to sending the first signal, either a mode of operation of the card is set, or the controller detects whether the mode of operation of the card is supported by the IHS in response to a second signal that is received through the in node.

18. The method of claim 17, wherein the IHS is configured to support cards that are set to operate in a receive mode of operation such that, when the first signal comprises a low signal, the controller detects that the card is not supported by the IHS when a high signal is received through the in node, and when the first signal comprises a high signal, the controller detects that the card is supported by the IHS when a high signal is received through the in node.

19. The method of claim 17, wherein the IHS is configured to support cards that are set to operate in a transmit mode of operation such that, when the first signal comprises a low signal, the controller detects that the card is supported by the IHS when a low signal is received through the in node, and when the first signal comprises a high signal, the controller detects that the card is not supported by the IHS when a low signal is received through the in node.

20. The method of claim 17, wherein the IHS is configured to support cards that are set to operate in a controlled/bi-directional mode of operation such that, when the first signal comprises a low signal, and the mode of operation of the card is set to a receive mode, and when the first signal comprises a high signal, and the mode of operation of the card is set to a transmit mode.

* * * * *